UNITED STATES PATENT OFFICE.

MARTIN FLEGLE, OF MINNEAPOLIS, MINNESOTA.

COVERING FOR STEAM-PIPES.

SPECIFICATION forming part of Letters Patent No. 348,958, dated September 14, 1886.

Application filed March 8, 1886. Serial No. 194,440. (No specimens.)

*To all whom it may concern:*

Be it known that I, MARTIN FLEGLE, a citizen of the United States, residing at Minneapolis, in the county of Hennepin and State of Minnesota, have invented a new and useful Composition of Matter to be Used as a Non-Conducting Covering for Steam-Pipes, Boilers, &c., of which the following is a specification.

My composition consists of the following ingredients, combined in about the proportions stated, viz: wood pulp, by measure, three parts; paper-pulp, by measure, three parts; kaolin, by measure, two parts. To these ingredients is added sufficient water containing copperas in solution, in proportion of two ounces to the gallon, to reduce the mass to a soft plastic condition. I then take thick flour-paste, by measure, one part; lime-putty, (thoroughly-slaked lime in a plastic condition,) by measure, one part; and reduce them to a soft plastic state by addition of salt-water containing salt in the proportion one pound of salt to a gallon of water. These two mixtures are then thoroughly mingled by stirring, and form a plastic mass ready for use. The fireproofing quality of the covering may be increased by reducing the quantities of both wood pulp and paper-pulp by about one part of each, and increasing the quantity of salt used to about three pounds of salt to the gallon of water.

The composition is applied, while in its plastic state, to the surface to be covered, and when dried is odorless, sufficiently elastic to permit ordinary expansion of the surface covered, and is practically fire-proof.

What I claim, and desire to secure by Letters Patent, is—

The herein-described composition of matter, consisting of wood pulp, paper-pulp, water having copperas in solution, flour-paste, lime-putty, and salt-water, substantially as hereinbefore set forth.

MARTIN FLEGLE.

Witnesses:
N. LEWIS,
P. H. GUNCKEL.